Figure 1:
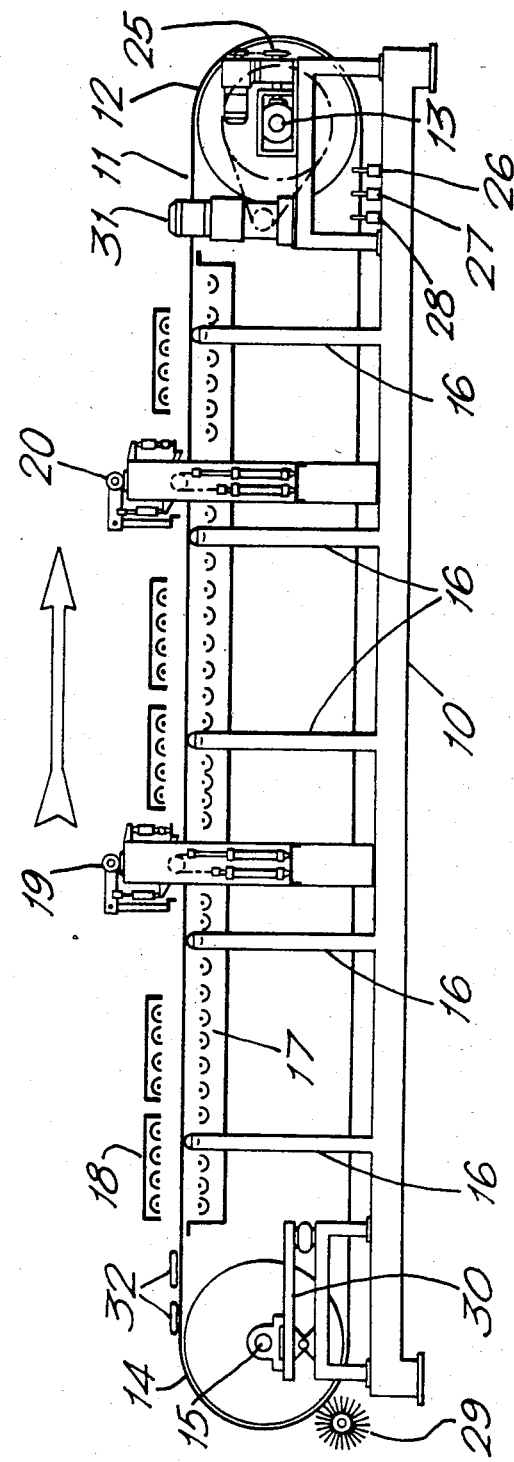

United States Patent [19]

Dagerskog et al.

[11] Patent Number: 4,565,704

[45] Date of Patent: Jan. 21, 1986

[54] METHOD AND APPARATUS FOR FRYING

[75] Inventors: Magnus Dagerskog, Aengelholm; Anders B. Ganrot; Kurt O. G. Jonsson, both of Bjuv, all of Sweden

[73] Assignee: Nestec S.A., Vevey, Switzerland

[21] Appl. No.: 509,416

[22] Filed: Jun. 30, 1983

[30] Foreign Application Priority Data

Oct. 4, 1982 [EP] European Pat. Off. ........ 82109147.7

[51] Int. Cl.$^4$ .......................... A23L 3/18; A47J 37/08
[52] U.S. Cl. ..................................... 426/233; 99/331; 99/386; 99/443 C; 426/243; 426/523
[58] Field of Search ............... 99/386, 443 C, 331, 99/325; 426/241, 243, 523, 438, 231, 233; 219/388

[56] References Cited

U.S. PATENT DOCUMENTS

| 2,491,687 | 12/1949 | Nutt | 99/386 |
| 2,504,110 | 4/1950 | Davis et al. | 99/386 |
| 3,371,595 | 3/1968 | Peters | 99/386 |
| 4,072,092 | 2/1978 | Kohli et al. | 99/386 |
| 4,151,791 | 5/1979 | Baker | 99/386 |

FOREIGN PATENT DOCUMENTS 843887 6/1970 Canada .

Primary Examiner—George Yeung
Attorney, Agent, or Firm—Vogt and O'Donnell

[57] ABSTRACT

A method and apparatus for contact frying a foodstuff wherein the foodstuff is transported on the upper run of a single solid endless thin steel conveyor belt which is heated from below by short wave infrared radiation.

9 Claims, 2 Drawing Figures

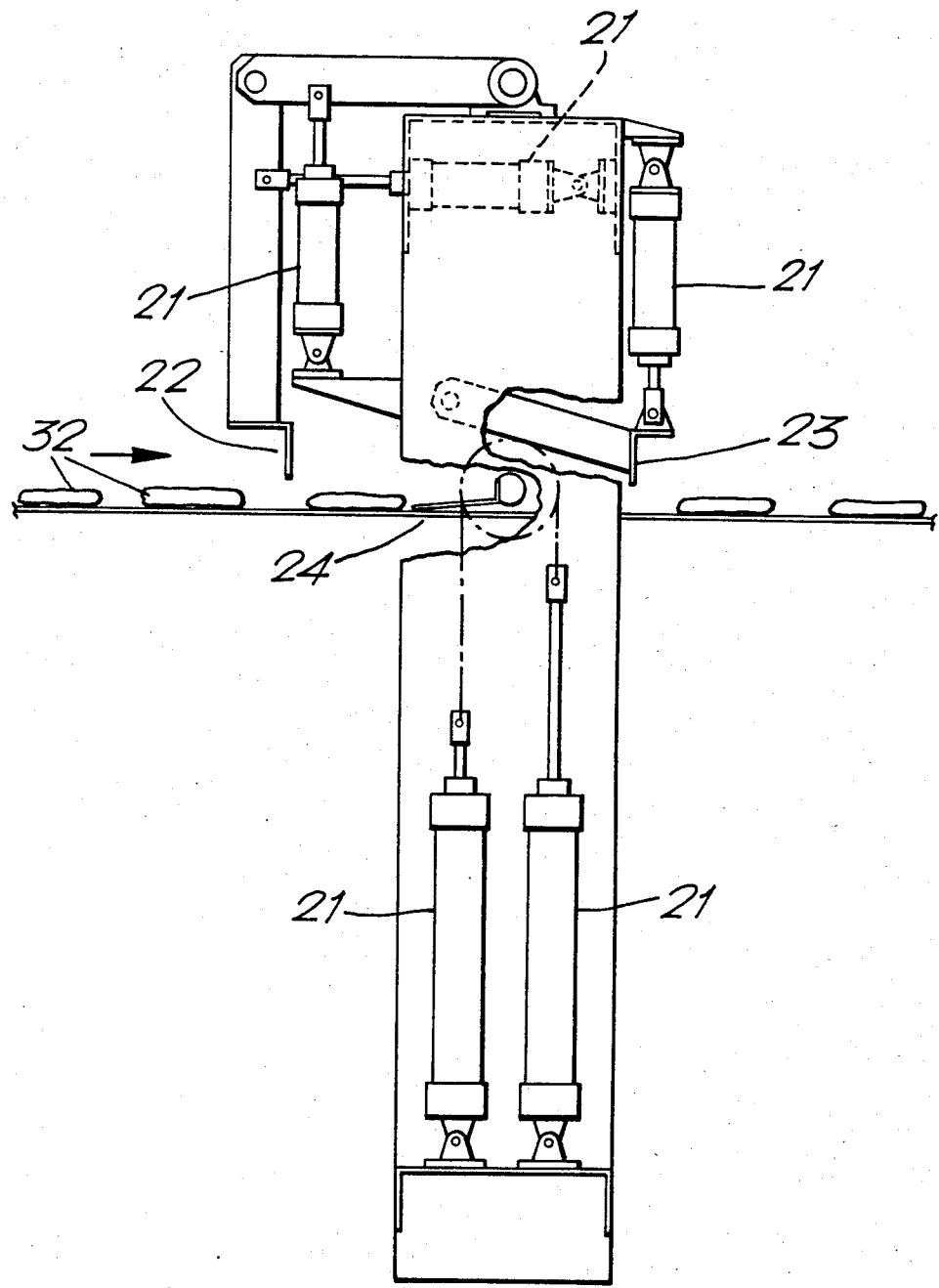

METHOD AND APPARATUS FOR FRYING

The present invention relates to a method and apparatus for frying, particularly for contact frying of a variety of foodstuffs on a continuous steel belt.

In many countries the traditional frying method at home is pan or contact frying. Nevertheless, deep fat frying and ovenfrying have been predominant industrial frying methods for a long time in these countries. Technically deep fat frying is an excellent process with many advantages, such as high capacity and great product flexibility. However, there are also some disadvantages, especially concerning the product quality parameters such as nutrition, flavour, appearance and shelf life. Therefore, in the food industry there is an increasing interest in returning to the traditional contact frying principle for various types of meat and minced meat products. The development of Teflon belt fryers some years ago is a good example of the present trend in this field.

Teflon belt fryers are the only commercially available contact fryers for use on an industrial scale and such a fryer comprises a Teflon coated fibre glass belt which travels over heating elements. However there are several disadvantages of Teflon belts some of which are as follows:

(1) Due to the physical properties of Teflon, very high temperature frying at above about 250° C. is not possible;

(2) At temperatures even below 200° C. the Teflon coated belts are relatively rapidly worn out;

(3) Fat can penetrate through the belt and cause burning and charring on the heating plate, and (4) The use of Teflon in the heat processing of food is thought to be dangerous to health.

Canadian Pat. No. 843,887 describes the use of stainless steel belts for frying hamburger patties wherein the patties are transported between, and in contact with, the adjacent runs of two thin continuous belts heated externally. However, two disadvantages of a method in which a food product is conveyed between, and in contact with, the adjacent runs of two belts are the limited flexibility and the unnatural appearance of the product: such a method is necessarily limited to products with substantially flat surfaces and gives rise to products which appear somewhat compressed owing to the prevention of dimensional changes which normally occur during protein denaturation.

We have now developed a method and apparatus for contact frying which is both flexible with regard to the type and shape of foodstuff and which gives rise to fried products with a natural appearance such as would be obtained by pan frying in the home.

Accordingly, the present invention provides an apparatus for the contact frying of a foodstuff characterised in that it comprises a single solid endless thin steel conveyor belt on the upper run of which the foodstuff may be transported, and which is heated from below by short wave infrared radiation.

The invention also provides a method of contact frying a foodstuff characterised in that the foodstuff is transported on the upper run of a single solid endless thin steel conveyor belt which is heated from below by short wave infrared radiation.

In defining the belt as "solid" we mean a belt that is substantially or completely uninterrupted by gaps or openings.

The thickness of the belt is conveniently from 0.5 mm to 2.0 mm and preferably from 1.0 mm to 1.5 mm. The belt is suitably made of mild steel. The length and width of the belt may vary according to the requirements.

The belt is conveniently trained over a head drum and a tail drum each rotating on a shaft.

Advantageously the apparatus is provided with an automatic belt controlling device in order to secure a straight running of the belt.

Owing to the temperature variations to which the steel belt is exposed, the length of the belt varies to some extent during operation. To compensate for these variations the tail drum bearings may be attached to a tension control device, for example, consisting of a lever actuated by compressed air bellows which gives the correct tension to the belt, irrespective of the belt temperature.

Conveniently, a rotating brush is situated at the tail drum end of the apparatus to remove product residues from the belt before fresh batches of product are transported through the heating zone. A separate gear motor may be used to move the brush.

Some products, for example meat patties, need frying on both sides and for such products a turning device may be fitted to the apparatus which turns the products, preferably twice. The turning operation may be controlled by a photocell.

The infrared radiation conveniently has a wavelength maximum in the range of from 0.70 $\mu$m to 2.5 $\mu$m, preferably from 0.76 $\mu$m to 2.0 $\mu$m and especially from 1.0 $\mu$m to 1.5 $\mu$m.

The infrared radiation may be provided by an appropriate number of infrared heaters situated below the upper run of the belt, preferably at a distance of from 50 mm to 150 mm below the belt. The heaters are advantageously positioned transversely to the direction of motion of the belt. If desired, provision may be made for moving the heaters within certain limits, in order to change the power/area ratio to suit different products. To prevent overheating of the infrared heaters, a compressed air system may be installed blowing air to the metal end connections of the heaters which are the parts most sensitive to overheating.

If desired, direct heating means may additionally be present above the upper run of the belt, preferably to provide short or medium wave infrared radiation, that is, having a wavelength maximum from about 0.70 $\mu$m to about 4.0 $\mu$m. The infrared radiation may suitably be provided by a further set of infrared heaters preferably at a distance of from 150 mm to 250 mm above the upper run of the belt. The heaters may be placed in modules and to prevent fat splashing on the heaters an air fan may be provided to blow air down from the heaters towards to belt.

The apparatus may expediently be provided with two separate control systems for the belt heating, viz. a sequence control system and a temperature control system. The sequence control system ensures that the belt heating is related to the presence of foodstuff on the belt. The temperature control system allows the temperature to be varied during frying. The heating of the belt may be controlled manually or automatically.

In the automatic control of the sequence system, photocells may be provided so that when the presence of foodstuff on the belt is indicated the infrared radiation supply means is activated and when the presence of foodstuff is no longer indicated the infrared radiation supply means is deactivated. The heating of an empty belt is thus avoided. In the automatic control of the temperature system, thermocouples may be in contact with the belt and by connection to a scanner, the temperature may be controlled and varied according to the frying requirements. The control may be carried out by means of power regulation or simple switch controls.

The apparatus may be protected against overheating, for instance, by means of the thermocouples which measure the belt temperature whereby if the temperature exceeds the upper limit there is an alarm indication and the heating power is immediately switched off.

The apparatus of the present invention may be used to heat a wide variety of foodstuffs for instance, any product suitable for pan frying, such as meat products, batter-based products, thin bread products and vegetables. Examples of meat products are meat patties, meat cubes, meat balls and pork chops. Examples of batter-based products are pancakes and omelettes. Examples of thin bread products are bread products filled with meat slices and folded into sandwiches as well as pizzas. Examples of vegetables are onions and cabbages.

The apparatus and method of the present invention enable a food product to be produced in a higher yield than that obtained by deep fat frying or oven frying. By this method it is possible to fry most meat products without fat addition or with very little fat added.

After frying, the products are conveniently deep frozen and then packaged.

The present invention will now be further described by way of example with reference to the accompanying drawings in which:

FIG. 1 is a diagrammatic sectional side view of an apparatus according to the invention and FIG. 2 is a diagrammatic side view of a turning device.

Referring to the drawings, the apparatus has a frame comprising two longitudinal hollow beams 10 which are joined by means of transversal beams (not shown). An endless steel belt 11 having a width of 800 mm is trained about a head drum 12 which rotates on a shaft 13 and a tail drum 14 which rotates on a shaft 15. Each drum has a diameter of 800 mm and the distance between the drum shafts is 6100 mm. The belt is supported from below by transversal slide bars made of cast iron 16. 100 mm below the upper run of the belt 11 are thirty infrared heaters 17 each having an effect of 3 kW with a maximum intensity at a wavelength of 1.2 μm. 200 mm above the upper run of the belt 11 are twenty infrared heaters 18 each having an effect of 4 kW with a maximum intensity at a wavelength of 3 μm. Positioned along the belt are turning devices 19 and 20 each comprising pneumatic cylinders 21, a push bar 22, a stop bar 23, and a turning plate 24. An automatic belt controlling device consists of a motor driven pressure unit 25 attached to one of the bearings of the head drum 12 and limit switches 26, 27, 28 on each side of, and at different distances from the belt. A rotating brush 29 made of nylon is situated at the tail drum end of the machine and the tail drum bearings are attached to a tension control device 30. A variable speed drive 31 is fitted at the head drum end of the apparatus. Minced meat patties 32 are shown on the upper run of the belt.

In operation, the belt 11 is set in motion by the drive 31 transmitting rotation to the head drum 12 from a drive shaft by a chain drive so that the upper run of the belt travels in the direction of the arrow in FIGS. 1 and 2. Minced meat patties 32 are fed in rows on to the upper run at the tail drum end of the belt, which affects a photocell (not shown) whereupon the infrared heaters 17 and 18 are automatically switched on successively just in front of the first row as it travels along the belt. When the belt is covered with foodstuff all the heaters are switched on. In a corresponding manner, the heaters are switched off successively until the last row of patties has passed the photocell. During their passage on the upper run of the belt, the meat patties are turned over twice by means of the turning devices 19 and 20. When a row of patties 32 reaches the turning plate 24 the push bar 22 is lowered behind the patties and pushes them forward onto the turning plate. Then the push bar is raised and returns to the starting position. The turning plate rotates 180° and turns the patties after which it returns to its original position where it is ready to receive the next row of patties. At the same time as the turning plate rotates forward, the stop bar 23 is lowered in front of the row of turned patties and remains in its low position for a moment so that when it is raised again the patties will leave the turning device in a straight line. In a modification (not shown) for turning products such as meat balls, meat cubes and similar products, the turning plate is capable not only of turning around its own axis but, in addition, it can move to a certain degree towards the products on the belt by means of pneumatic cylinders installed in each end of the turning plate. In order to ensure straight running of the belt the motor driven pressure unit 25 can change the angle of the driving shaft 13 by pushing its end backwards or forwards a few millimeters under the influence of the pair of limit switches 26 which are the nearest switches to the belt. The pair of limit switches 27, which are further from the belt activate an alarm if the belt, in spite of the control device, comes out of direction. The pair of limit switches 28, which are farthest from the belt, stop the drive motor if the belt reaches one of them. After the patties have been cooked they leave the belt at the head drum end where they are transferred onto another conveyor and carried away.

We claim:

1. A method of contact frying a foodstuff which comprises transporting the foodstuff on the upper run of a single solid endless thin steel conveyor belt which is heated from below by short wave infrared radiation, sensing the temperature of said belt and controlling said radiation in response to changes in said temperature.

2. A method of contact frying a foodstuff which comprises transporting the foodstuff on the upper run of a single solid endless thin steel conveyor belt which is heated from below by short wave infrared radiation, detecting a foodstuff on the belt and controlling said radiation in response to the presence of said foodstuff.

3. A method according to claim 1 or claim 2, wherein said short wave infrared radiation has a wavelength maximum of from 0.76 μm to 2.0 μm.

4. An apparatus for the contact frying of a foodstuff comprising a single solid endless thin steel conveyor belt on the upper run of which the foodstuff is transported, means for heating said belt from below by short wave infrared radiation, and means for sensing the temperature of the belt and controlling the operation of said heating means in response to changes in said belt temperature.

5. An apparatus according to claim 4, wherein the thickness of the belt is from 1.0 mm to 1.5 mm.

6. An apparatus according to claim 4, wherein the belt is made of mild steel.

7. An apparatus according to claim 4, wherein the means for heating said belt provides infrared radiation with a wavelength maximum of from 0.76 μm to 2.0 μm.

8. An apparatus according to claim 4, further comprising direct heating means above the upper run of the belt to provide infrared radiation with a wavelength maximum from about 0.70 μm to about 4.0 μm.

9. An apparatus for the contact frying of a foodstuff comprising a single solid endless thin steel conveyor belt on the upper run of which the foodstuff is transported, means for heating said belt from below by short wave infrared radiation, and means for detecting a foodstuff on the belt and controlling the operation of said heating means in response to the presence of said foodstuff on said belt.

* * * * *

UNITED STATES PATENT AND TRADEMARK OFFICE
CERTIFICATE OF CORRECTION

PATENT NO. : 4,565,704

DATED : January 21, 1986

INVENTOR(S) : Magnus Dagerskog, et al.

It is certified that error appears in the above-identified patent and that said Letters Patent is hereby corrected as shown below:

Claims 5 - 9 should read as follows:

-- 5. An apparatus for the contact frying of a foodstuff comprising a single solid endless thin steel conveyor belt on the upper run of which the foodstuff is transported, means for heating said belt from below by short wave infrared radiation, and means for detecting a foodstuff on the belt and controlling the operation of said heating means in response to the presence of said foodstuff on said belt. --

-- 6. An apparatus according to claim 4 or claim 5, wherein the thickness of the belt is from 1.0 mm to 1.5 mm. --

-- 7. An apparatus according to claim 4 or claim 5, wherein the belt is made of mild steel. --

-- 8. An apparatus according to claim 4 or claim 5, wherein the means for heating said belt provides infrared radiation with a wavelength maximum of from 0.76 um to 2.0 um. --

UNITED STATES PATENT AND TRADEMARK OFFICE
CERTIFICATE OF CORRECTION

PATENT NO. : 4,565,704

DATED : January 21, 1986

INVENTOR(S) : Magnus Dagerskog et al.

It is certified that error appears in the above-identified patent and that said Letters Patent is hereby corrected as shown below:

-- 9. An apparatus according to claim 4 or claim 5, further comprising direct heating means above the upper run of the belt to provide infrared radiation with a wavelength maximum from about 0.70 um to about 4.0 um. --

Signed and Sealed this

Twenty-fifth Day of November, 1986

Attest:

DONALD J. QUIGG

*Attesting Officer*     *Commissioner of Patents and Trademarks*